March 26, 1968  H. FLEISSNER  3,374,552
SIEVE DRUM DRYER

Filed May 7, 1965  3 Sheets-Sheet 1

Inventor:
HEINZ FLEISSNER
BY Dicke + Craig
ATTORNEYS

Inventor:
HEINZ FLEISSNER
BY Dicke & Craig
ATTORNEYS

March 26, 1968  H. FLEISSNER  3,374,552
SIEVE DRUM DRYER

Filed May 7, 1965  3 Sheets-Sheet 3

(A-A)

Inventor:
HEINZ FLEISSNER

BY Craig & Antonelli
ATTORNEYS

United States Patent Office 3,374,552
Patented Mar. 26, 1968

3,374,552
SIEVE DRUM DRYER
Heinz Fleissner, Egelsbach, near Frankfurt, Germany, assignor to Anstalt fur Patentdienst, Vaduz, Liechtenstein
Filed May 7, 1965, Ser. No. 453,970
Claims priority, application Switzerland, May 8, 1964, 6,041/64
10 Claims. (Cl. 34—115)

ABSTRACT OF THE DISCLOSURE

The present disclosure relates to an apparatus for the treatment of materials, for example textile materials, which comprises a substantially closed housing, more than one conveying means rotatably disposed within said housing, said conveying means being disposed in at least two rows which are staggered to each other, partition means dividing the apparatus into a treatment chamber and a fan chamber, radial fan wheel means disposed within said fan chamber, and air guide means disposed in the spaces between at least some of the radial fan wheel means, into which spaces flows the exhausted air from the conveying means.

---

The present invention relates to a sieve drum dryer for materials of all kinds, especially textiles, with a casing and with preferably two rows of sieve drums in mutually staggered arrangement, whereby the material to be processed is held on the jackets of the sieve drums by a partial vacuum in the interior of the sieve drums and is guided alternately over a sieve drum of the one and the other row; the partial vacuum in the sieve drums is created by radial fan wheels at least some of which are accommodated in a common fan chamber within the casing.

Sieve drum dryers with two rows of sieve drums in mutually staggered arrangement are known, at the side, or end faces of which are arranged radial fan wheels which produce a partial vacuum in the sieve drums for holding the material to be processed. Each of these radial fan wheels is thereby accommodated in a housing provided with a blow-out opening which is directed upwardly with the radial fan wheels of the lower row of sieve drums and which is directed downwardly with the radial fan wheels of the upper row of sieve drums. The air discharged through the openings of the fan housings is returned into the treatment chamber in which the sieve drums are arranged by way of heating tubes.

When penetrating through the material to be processed, the air becomes enriched with moisture. Since with sieve drum dryers, which are generally operated according to the counter-current principle, part of this air must be continuously replaced by fresh air, the fan of the sieve drum sucks in fresh air at the outlet end of the materials to be treated while the fan of the sieve drum at the inlet end of the device discharges moist air.

Sieve drum dryers whose radial fan wheels are surrounded by fan housings incorporate essential disadvantages.

On the one hand, the fan housings are very expensive and their proportion of the total costs of the sieve drum dryers is considerable, and, on the other hand, they require much space and limit the diameter of the radial fan wheels to a certain size. Another essential disadvantage is that the air flow conditions in the treatment chamber are completely uncontrolled which affects the drying effect; even more important is that, owing to the formation of air whirls, part of the fiber fleece may be blown off the drum, especially if loose fibrous material is processed.

In order to avoid the air exchange according to the counter-current principle within the treatment chamber, in the case of another known device, a sieve floor was arranged above the treatment chamber properly speaking, and the air blown out by the fan was guided by way of air heaters and through this sieve floor into the space separated from the treatment chamber, properly speaking. An air exchange and pressure equalization was intended to take place in this separate space. However, on the one hand, the provision of a sieve floor renders the device more expensive and, on the other hand, the results hoped for were not achieved. For this reason, a special channel between sieve drums and radial fan wheels for the air exchange was provided in another known device. It is obvious that this measure results in a further considerable increase of the costs of the device.

Furthermore, sieve drum dryers with one row of sieve drums disposed in series one closely behind the other are known wherein double-flow radial fan wheels are arranged at the sides of the drums. In this construction, the fan wheel housings are provided with an upper and a lower blow-out opening. The main advantage of these blowers is that larger radial fan wheels can be used whereby the air capacity of the individual blowers is increased. However, double-flow radial fan wheel have only been used with one row of sieve drums because, with the sieve drums in staggered arrangement the problem of air guidance could not be solved.

For a sieve drum dryer with sieve drums in mutually staggered arrangement, it has already been suggested to arrange fan wheels at the side or end faces of the individual sieve drums which fan wheels suck the air out of the drum interior and blow the air axially into a common fan chamber in which also the heating tubes are accommodated. However, in practice, this suggestion has not met with approval because such fan wheels have only a low capacity and because the flow conditions of the air blown off cannot be controlled, so that vigorous air whirls are formed which cause capacity losses and differential suction drafts as well as detachment or blowing-off of the material from the sieve drum jacket.

An object of the present invention is to produce a sieve drum dryer in which the aforementioned disadvantages are obviated in the simplest possible manner.

Another object of the present invention resides in the provision of a sieve dryer which is relatively inexpensive in cost yet excels by relatively high capacity.

A further object of the present invention resides in the provision of a sieve dryer which permits the use of radial fan wheels of relatively large diameter without the need for cumbersome fan housings.

Another object of the present invention resides in the provision of several drum dryers capable of using relatively large fan wheels without producing undesirable air whirls.

Still another object of the present invention resides in a sieve drum dryer which permits the use of large fan wheels without attendant flow losses due to uncontrolled flow conditions and differential suction drafts.

A further object of the present invention is a sieve drum dryer which utilizes extremely simple air guide structures that are relatively inexpensive and easy to manufacture and install.

In accordance with the present invention, this problem is solved with a sieve drum dryer of the type described hereinabove, in that preferably only the spaces between two radial fan wheels each, into which spaces the air flows in opposite directions, are subdivided by air guide sheets.

The expensive fan housings are therefore obviated by the present invention, and are replaced by simple air guides which essentially are provided in those zones only in which, without these air guides, air whirls would be caused by the air flowing into these spaces in opposite directions, which air whirls would cause considerable losses in capacity and completely uncontrollable air flow conditions. At the same time, it is achieved thereby that the air exchange according to the counter-current principle and/or uniflow principle is effected in the fan chamber so that all detrimental transverse air currents which lead to the formation of air whirls are kept out of the treatment chamber. Furthermore, considerably larger fan wheels can be used. Since as is well known, the circulated air volume increases with the third power of the fan wheel diameter, a substantially more powerful suction draft and thus partial vacuum can be created in the sieve drums so that now also relatively heavy materials, for which it was previously impossible to use sieve drum dryers, can be held onto and dried with the sieve drum dryer according to the present invention.

In realization of the present invention, it is suggested to choose the same direction of rotation for the radial fan wheels of each row of sieve drums, but to choose mutually opposing directions of rotation for the two rows so that air guides are only required within the spaces between two radial fan wheels of one and the same row. In order to achieve good air exchange between the sieve drums of the upper and lower row, the air guides can be extended close to a third radial fan wheel, adjacent to the radial fan wheels divided from each other by the air guides. The extension of the air guides into proximity of a third fan wheel is, however, not absolutely necessary.

The distance between the air guides and the fan wheels arranged at the two sides may be equal. However, the distances can preferably be varied and adapted to the optimum fan output.

Another favorable correlation of the direction of rotation of the individual fan wheels according to this invention is that all fan wheels of one row rotate in the same direction while those of the other row rotate in mutually opposite direction. In the case of this arrangement, the one row of fan wheels is divided by air guides, and each second air guide has associated with it at its lower end two further air guides which subdivide the free space between the radial fan wheels of the one row and the adjacent radial fan wheel of the other row, which fan wheel is arranged between the two said fan wheels so that star-shaped air guide structures result.

The use of an extremely small number of air guides is achieved if two adjacent radial fan wheels of one row rotate in opposite directions. In the case of this arrangement of the radial fan wheels, only one air guide each is required between two adjacent fan wheels of the two rows which fan heels rotate in mutually opposite directions. Air guides beteen the adjacent radial fan wheels of one and the same row are not required.

A further modification according to the present invention is that two fan wheels of the same row both rotating in the same direction, are associated with an adjacent fan wheel of the other row which adjacent fan wheel rotates in the opposite direction so that three radial fan wheels each in triangular arrangement are mutually correlated and cooperate with one another whereby an extremely good air mixing is obtained.

The aforementioned embodiments of the present invention relate essentially to a sieve drum dryer which either works according to the counter-current principle or to the uniflow principle. However, the present invention can also be applied to a sieve drum dryer wherein a part of the sieve drums operate according to the uniflow principle and another part according to the counter-current principle or vice versa. It is, in general, advisable with such an installation to provide two fan chambers, viz. one for the uniflow and one for the counter-current principle. But it is also feasible that, by appropriate arrangement of the directions of rotation of the radial fan wheels, all radial fan wheels are accommodated in a common fan chamber. It will be necessary to decide which possibility is to be given preference for each new sieve drum dryer.

It is true of all illustrated embodiments of the present invention that the air exchange according to the counter-current and/or the uniflow principle takes place in the fan chamber. Disturbances of the air flow conditions in the treatment chamber and disturbing air whirls are largely eliminated.

These and further objects, features and advantages of the present invention will become more obvious from the following description when taken in connection with the accompanying drawing which shows, in longitudinal cross section trough the fan chambers for purposes of illustration only, several embodiments in accordance with the present invention, and wherein.

Figure 1:
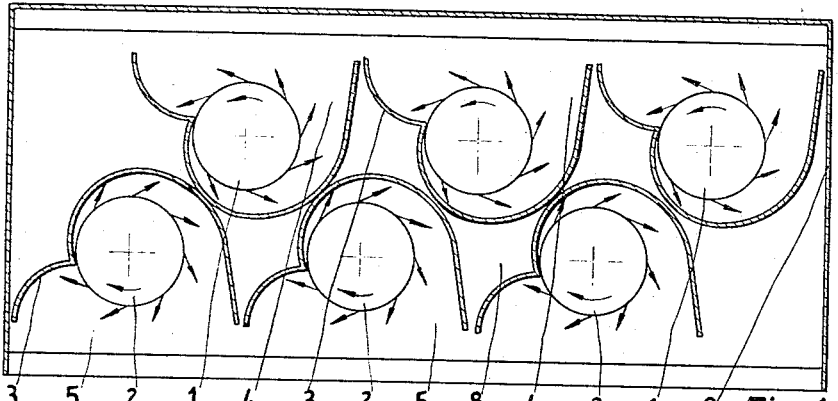
FIG. 1 is a construction of the prior art.

Referring now to the drawing wherein like reference numerals are used throughout the various views to designate like parts, there is provided in all embodiments a row of upper radial fan wheels 1 and a row of lower radial fan wheels 2. Each radial fan wheel 1 or 2 of FIGURE 1 is surrounded by a fan housing 3 which is provided with an upper or a lower blow-out opening 4 or 5. As may be gathered from FIGURE 1, the fan housings 3 require relatively much space, so that the diameter of the individual fan wheels is limited. However, small radial fan wheels do not possess as large an air circulating capacity as large radial fan wheels; furthermore, these curved housings are difficult to manufacture and extremely expensive.

Figure 2:
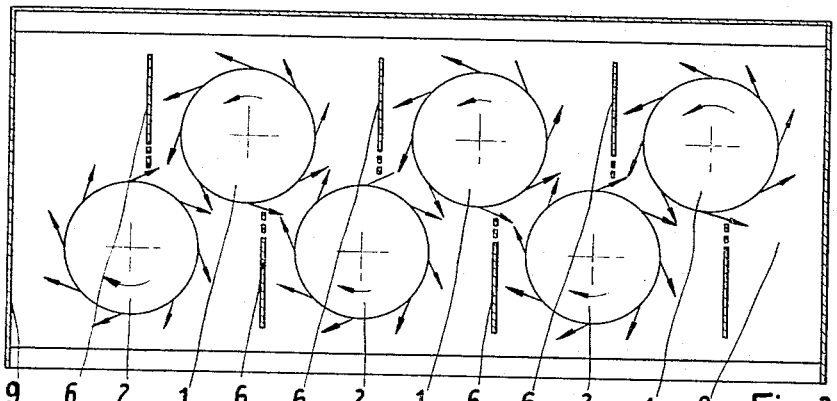
FIG. 2 is a construction according to the present invention with the radial fan wheels of one row each rotating in the same direction.

In the construction according to the present invention shown in FIGURE 2 substantially larger radial fan wheels 1 and 2 are provided and the expensive fan housing 3 of FIG. 1 are omitted and only in the spaces between two adjacent radial fan wheels of one row, plane air guides 6 are provided which prevent air whirls caused by the air blown from the radial fan wheels in opposite directions. The air guides 6 can, as indicated in dashed lines, be extended close to the adjacent radial fan wheel of the adjacent row in order to ensure that the air of the upper row of sieve drums is well mixed with the air of the lower row of sieve drums. At the same time, the air guides 6 of this embodiment of the present invention are arranged at varying distances from the radial fan wheels disposed on both sides.

Figure 3:
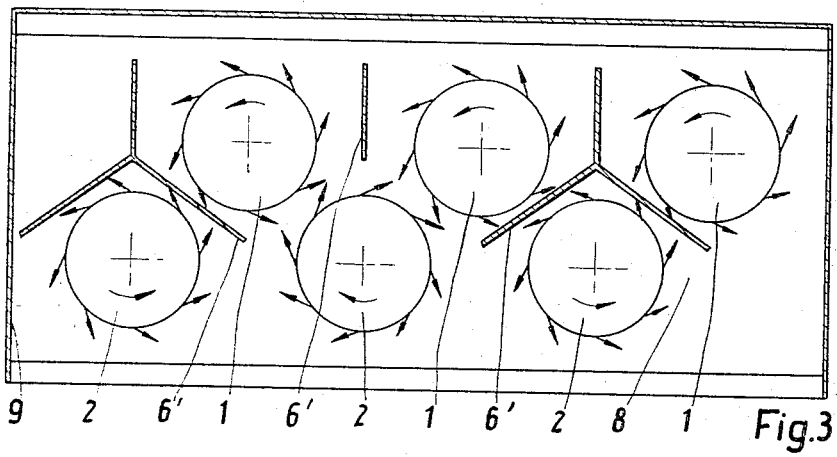
FIG. 3 is a modification of the device according to FIG. 2 with the radial fan wheels of the lower row rotating in opposite direction.

In another arrangement, as shown in FIG. 3, wherein the radial fan wheels 1 of the upper row rotate for example in the same direction and the radial fan wheels 2 of the lower row then rotate in mutually opposite directions, air guides 6 have to be provided in the arrangement shown, if unfavourable air whirls are to be avoided. A three-part, star-shaped air guide 6′ may thus be installed alternately with a simple air guide 6.

Figure 4:
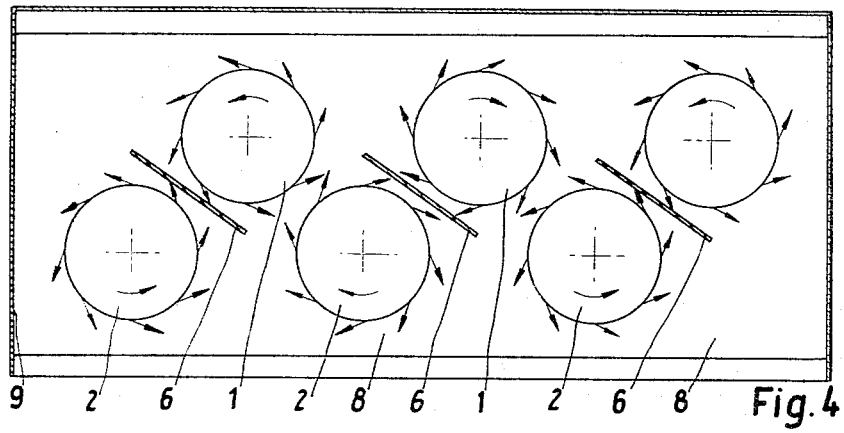
FIG. 4 is a construction according to the present invention wherein the radial fan wheels of one row as well as those of the other row rotate in opposite directions.

A particularly small number of simple air guides is required if the upper radial fan wheels 1 rotate in mutually opposite directions and also the lower radial fan wheels 2 rotate in opposite directions as is shown in FIGURE 4.

Figure 5:
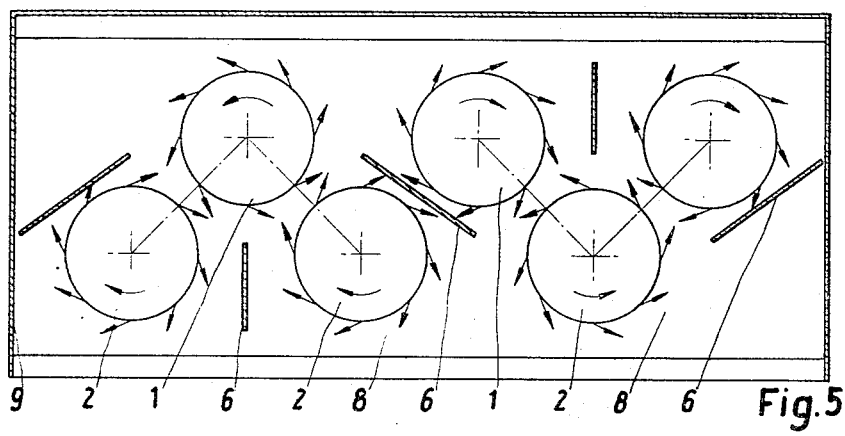
FIG. 5 is another exemplary embodiment of the present invention wherein three radial fan wheels are mutually correlated in a triangular arrangement and FIG. 6 is a device with radial fan wheels for a sieve drum dryer wherein part of the sieve drums operate according to the uniflow principle and part of the sieve drums operate according to the counter-current principle.

An extremely good air mixing is achieved if three adjacent fan wheels of the two groups each in triangular arrangement are correlated, and cooperate with each other. The position of the air guides 6 necessary in this case is clearly shown in FIGURE 5.

Figure 6:
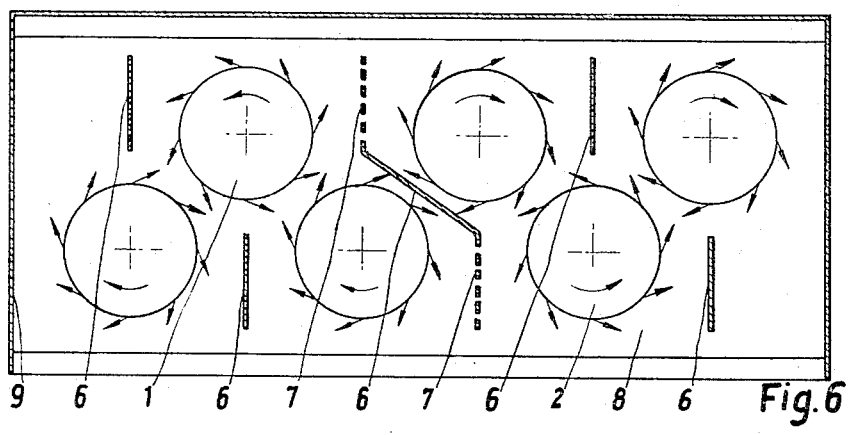

FIGURE 6 shows an embodiment of the present invention wherein part of the sieve drums work according to uniflow principle and part of the sieve drums work according to the counter-current principle. The radial fan wheels of the sieve drums working according to one and the same principle can be arranged in a common fan chamber and the two fan chambers can be divided by a partition wall 7. However, it is also feasible, that all radial fan wheels are accommodated in a common chamber and that the air currents are separated only by an oblique air guide 6. FIGURE 6 shows both possibilities, the vertical portions of the partition wall 7 being shown in dashed line. The partition wall may also be perforated.

By virtue of the present invention the manufacturing costs of a sieve drum dryer can be considerably reduced without resulting in disadvantages, such as capacity losses and the like. On the contrary, by accommodating essentially larger radial fan wheels, the air circulation can be further improved, and this, in turn, results in shorter periods of presence within the dryer for the material to be processed or in smaller devices (fewer drums), and greater economy.

With all illustrated embodiments of the present invention, a casing 9 of the sieve drum dryer is divided by a vertical partition wall 8 in a fan chamber, in which the fan wheels are accommodated, and in a treatment chamber in which the sieve drums are accommodated. At the upper end and the lower end thereof the two chambers are connected with each other so that the air sucked out of the treatment chamber by the fans can be returned.

Figure 7:
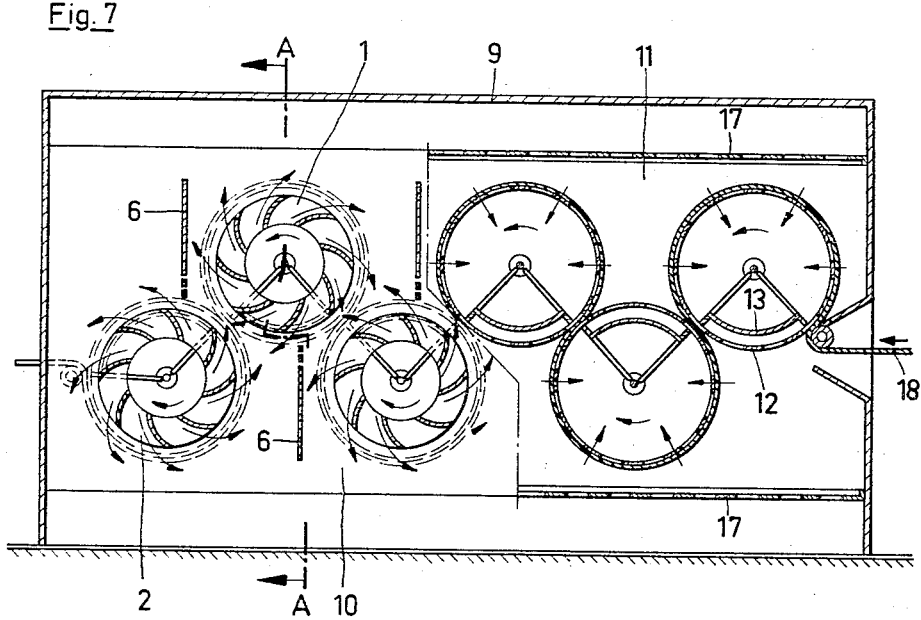
FIG. 7 illustrates the apparatus of the present invention including Sieve Drum means, the path of the material being treated, the path of the air relative to the radial fans, etc.
Figure 8:
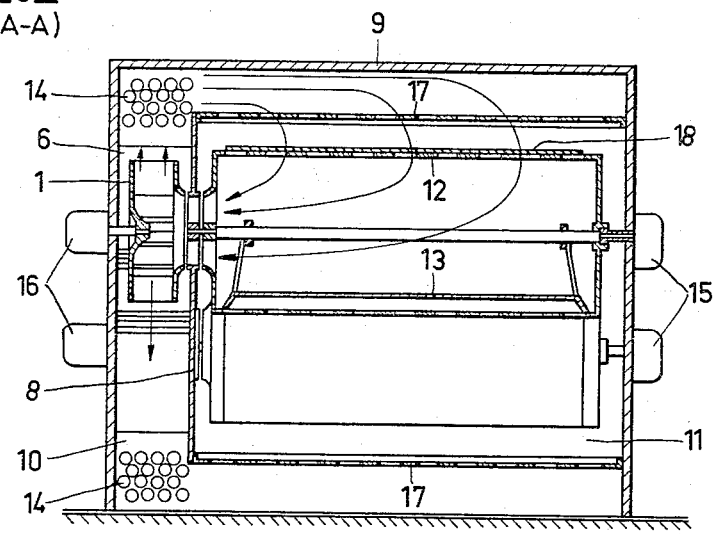
FIG. 8 is a view of the apparatus of FIGURE 7 taken along line A—A.

More particularly, the sieve drum dryer of the present invention according to FIGURES 7 and 8 has a housing or casing 9 sub-divided by a partition 8 into a ventilator or fan chamber 10 and a treatment chamber 11. FIGURE 7 shows two views of the sieve drum dryer. The left hand portion shows a section through the ventilator chamber 10 and the right hand portion shows a section through the treatment chamber 11. In the treatment chamber 11 sieve drums 12 are arranged in two rows offset from one another. A stationary cover plate 13 is provided in the sieve drums on that side which is free from the material being treated, which plate interrupts the suction draft at the material-free portion of the sieve drum. The material 18 to be treated is passed alternately around the sieve drums. Ventilator or fan wheels 1 or 2 pertain to each sieve drum, which ventilator subjects the sieve drums to a suction draft and discharges the drawn-in air at all sides. Due to the arrangement of the ventilators and the arrangement of the air guide means of air baffles 6, air ejected from the fans 1 and 2 flows upwardly and downwardly and passes via heating means 14 from the ventilator chamber back into the treatment chamber, as can be seen from FIGURE 8. In this connection the air baffles 6 substantially prevent the formation of eddies since they are provided at those places where the air streams ejected from the ventilators would oppose each other and thus collide. The drive means 15 for the drums, as well as the ventilator drive means 16, are mounted at the outside of housing 9. Above and below the sieve drums 12, sieve covers 17 are provided in the treatment chamber 11 which serve to render a uniform air flow across the operating width.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. An apparatus for the treatment of materials which comprises a substantially closed housing, more than one cylindrical sieve drum rotatably disposed within said housing, said cylindrical sieve drums being disposed in at least two rows which are staggered to each other, a portion of the surfaces of said cylindrical sieve drums serving as conveying means, partition means dividing the apparatus into a treatment chamber and a fan chamber, laterally disposed radial fan wheel means without a fan housing disposed within said fan chamber, and air guide means disposed in the spaces between at least some of the radial fan wheel means, into which spaces flows the exhausted air from the cylindrical sieve drums.

2. The apparatus of claim 1, wherein the direction of rotation of the radial fan wheel means in the same row is the same and opposite to the direction of rotation of the fan wheel means in the adjacent rows and the air guide means are disposed in the spaces between two radial fan wheel means of the same row.

3. The apparatus of claim 2, wherein the air guide means extends in close proximity to the staggered radial fan wheel means of the adjacent rows.

4. The apparatus of claim 3, wherein the extended portion of the air guide means is perforated.

5. The apparatus of claim 2, wherein the distance between the air guide means and adjacent fan wheel means varies.

6. The apparatus of claim 1, wherein the direction of rotation of the radial fan wheel means of one row is the same and the direction of rotation of each fan wheel means in the adjacent rows is opposite to the next adjacent fan wheel means in the same row and wherein the air guide means are disposed in the spaces between the radial fan wheel means in the row containing the fan wheel means having the same direction of rotation, the alternating air guide means having associated at their lower end additional air guide means extending into the spaces between staggered radial fan wheel means of different rows.

7. The apparatus of claim 1, wherein the direction of rotation of each fan wheel means in the same rows is opposite to the direction of rotation of adjacent fan wheel means in the same rows, and the air guide means are disposed between two adjacent fan wheel means of different rows which rotate in the same direction.

8. The apparatus of claim 1, wherein two fan wheel means of the same row both rotate in the same direction and opposite to a fan wheel means of an adjacent row thereby forming three radial fan wheel means in triangular arrangement, and air guide means disposed in the spaces between fan wheel means of the same row rotating in the same direction and the spaces between fan wheel means of adjacent rows rotating in the same direction.

9. The apparatus of claim 8, wherein the air guide means are disposed in the spaces between fan wheel means in each row and the spaces between fan wheel means of adjacent rows rotating in the same direction.

10. The apparatus of claim 9, wherein the air guide means are perforated.

References Cited

UNITED STATES PATENTS 1,377,793   5/1921   Schwartz _____ 34—115 X

FOREIGN PATENTS 591,500   1/1960   Canada.
336,540   10/1930   Great Britain.
944,999   12/1963   Great Britain.

FREDERICK L. MATTESON, Jr., *Primary Examiner.*

A. D. HERRMANN, *Assistant Examiner.*